United States Patent
Nobuhara et al.

(10) Patent No.: US 9,908,242 B2
(45) Date of Patent: Mar. 6, 2018

(54) ROBOT CONTROL DEVICE PROVIDED WITH FUNCTION OF REFLECTING POINTS OF DIFFERENCE OF SETTING DATA COMPARED WITH

(71) Applicant: FANUC Corporation, Yamanashi (JP)

(72) Inventors: Atsushi Nobuhara, Yamanashi (JP); Hiroji Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 169 days.

(21) Appl. No.: 14/734,458

(22) Filed: Jun. 9, 2015

(65) Prior Publication Data

US 2015/0352724 A1 Dec. 10, 2015

(30) Foreign Application Priority Data

Jun. 10, 2014 (JP) .................. 2014-119654

(51) Int. Cl.
*B25J 13/06* (2006.01)
*B25J 13/00* (2006.01)
*G05B 19/02* (2006.01)

(52) U.S. Cl.
CPC ............. *B25J 13/06* (2013.01); *B25J 13/006* (2013.01); *G05B 19/02* (2013.01); *Y10S 901/06* (2013.01)

(58) Field of Classification Search
CPC ........... G06F 8/71; B25J 13/06; B25J 13/006; G05B 19/02
See application file for complete search history.

(56) References Cited

U.S. PATENT DOCUMENTS

| | | | |
|---|---|---|---|
| 6,226,652 B1* | 5/2001 | Percival | G06F 8/71 707/695 |
| 6,327,516 B1 | 12/2001 | Zenke | |
| 2010/0092032 A1* | 4/2010 | Boca | B25J 9/1679 382/103 |
| 2011/0161054 A1* | 6/2011 | Woolf | G06F 17/50 703/1 |

FOREIGN PATENT DOCUMENTS

| | | |
|---|---|---|
| JP | 33-226704 A | 9/1988 |
| JP | H05-346811 A | 12/1993 |
| JP | 10-254527 | 9/1998 |
| JP | 11-296217 A | 10/1999 |
| JP | 2001-134309 A | 5/2001 |
| JP | 2001-154723 A | 6/2001 |
| JP | 2009-282822 A | 12/2009 |
| JP | 2010-214572 A | 9/2010 |
| WO | 2009/011437 A1 | 1/2009 |
| WO | 2009/097895 A1 | 8/2009 |

* cited by examiner

Primary Examiner — Adam R Mott
(74) Attorney, Agent, or Firm — Hauptman Ham, LLP

(57) ABSTRACT

A robot control device which can exchange data with a plurality of robot control devices and with a storage medium which stores setting data of the robot control device, which robot control device can compare setting data which is set a specific robot control device and setting data which is set at another robot control device and setting data which is stored in the storage medium, at least two, for each item, display items with differences between the compared setting data, and reflect that selected setting data.

12 Claims, 6 Drawing Sheets

```
R[1]  = 10.4             R[1]  = 10.4
                         R[2]  = -12.5
11 DISPLAY SCREEN        R[3]  = 68.6
22 DISPLAY SCREEN        R[4]  = 75
   ......                R[5]  = 1.1
8  COMPARE DATA          R[6]  = 1000
                         R[7]  = 101
R[8]  = 102              R[8]  = 106
R[9]  = 103              R[9]  = 103
R[10] = 104              R[10] = 103
```

W

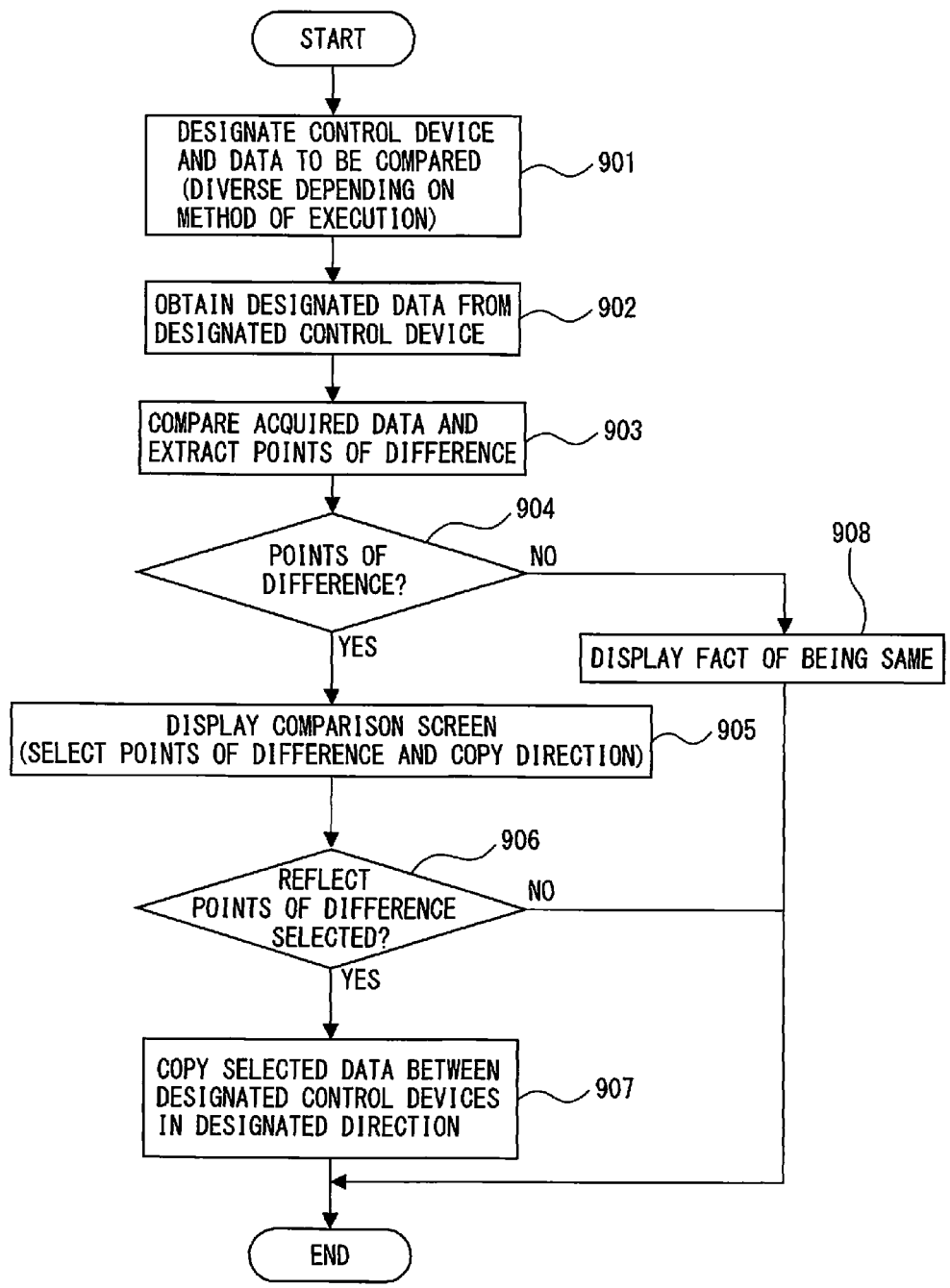

ROBOT CONTROL DEVICE PROVIDED WITH FUNCTION OF REFLECTING POINTS OF DIFFERENCE OF SETTING DATA COMPARED WITH

RELATED APPLICATIONS

The present application claims priority to Japanese Application Number 2014-119654, filed Jun. 10, 2014, the disclosure of which is hereby incorporated by reference herein in its entirety.

BACKGROUND OF THE INVENTION

1. Field of the Invention

The present invention relates to a robot control device which has the function of being able to compare setting data of the robot control device with setting data of another robot control device or past setting data of the robot control device, display the points of difference on a screen of the robot control device in a form enabling comparison, and reflect the points of difference in the setting data of the robot control device which is performing a setting operation.

2. Description of the Related Art

When setting a robot control device, sometimes the device is set with reference to setting data of another control device which has already finished being set. The reason is that in the case of robot control devices, often the setting data is the same in many setting items. In this case, the setting data is sometimes copied between the robot control devices. This copying work is performed by manual input while viewing paper on which the setting data is printed or the teaching device of the other robot.

As an example of referring to data between control devices, there is a cell controller which controls a plurality of processing cells which including pallets which supply workpieces to numerical control machine tools. A cell controller where screens of a plurality of numerical control devices are displayed at screens at the cell controller and the data is reflected between numerical control devices is described in Japanese Patent Publication No. 5-346811A. Similarly, it is possible to display the screens of a plurality of control devices on a single display device and set them while comparing the screens. Further, it is possible to store data of a certain control device as a file and read it into another control device for setting the device.

However, when copying setting data of a robot control device by manual input, if the number of setting items is large, tremendous work becomes necessary. On the other hand, it is simple operation-wise to load a setting file, but sometimes data which should not be copied from another control device also ends up being loaded together. In such a case, resetting becomes necessary and time is wasted. Furthermore, in many cases the need for resetting is not noticed or the resetting becomes extremely difficult. The process is therefore not efficient.

Further, as disclosed in Japanese Patent Publication No. 5-346811A, with the method of displaying the screens of a plurality of control devices on a single screen, it only becomes possible to edit the content displayed on the screen, so the operator has to compare data to find points of difference and move setting data. There is therefore the problem that the efficiency is not good.

SUMMARY OF THE INVENTION

On one aspect, the present invention has as its object the provision of a robot control device which enables comparison of setting data of this robot apparatus with setting data of another robot control device and past setting data which is recorded in a storage medium etc. when setting a specific robot control device. Further, it has as its object, when comparing setting data, displaying the points of difference in a format enabling comparison on the screen of a robot control device, selecting the necessary points of difference among them, and setting the selected data thereby reflecting setting data of that robot control device.

According to a first embodiment of the present invention, there is provided a robot control device comprising a display device and a control device and comprising at least one of a data communication device which communicates data with another robot control device and a data read/write device which reads and writes setting data with a storage medium which stores setting data of a robot control device, the robot control device comprising a comparison device which compares, for each item, first setting data which is set at the control device with at least one of second setting data which is set at a control device at the other robot control device and third setting data which is stored at the storage medium and a display circuit which displays on the display device items in which the comparison by the comparison device reveals differences between the first setting data and other setting data and setting data of the items with differences so as to enable at least comparison.

According to a second embodiment of the present invention, there is provided a plurality of robot control devices which are connected by a data communication device and which are provided with at least one display device which can display setting data, comprising a comparison device which designates setting data which is set at a specific robot control device as main data and setting data which is set at other robot control devices as secondary data and which compares, for each item, the main data and the secondary data and a display circuit which displays on the display device at least items of the secondary data with differences from the main data and the setting data of the items with differences so as to enable at least comparison.

According to a third embodiment of the present invention, there is provided a robot control device which comprises a display device which can display setting data and which reads and writes setting data with at least one of a storage medium in which setting data of another robot control device is stored and a storage medium in which setting data of the robot control device where at least part of the items of the setting data have been changed is stored, the robot control device further comprising a comparison device which designates setting data which is set at the robot control device as main data and setting data which is stored at the storage medium as secondary data and which can compare, for each item, the main data and the secondary data and a display circuit which displays on the display device at least items of the secondary data with differences from the main data and the setting data of the items with differences so as to enable at least comparison.

According to the robot control device of the present invention, there is the effect that an operator can easily recognize different data in data of another control device and the control device being set and select only what is necessary and reflect it from one control device to the other control device, so the man-hours in setting data of a control device can be slashed.

BRIEF DESCRIPTION OF THE DRAWINGS

The present invention will be understood more clearly by referring to the drawings attached below.

FIG. 3 is a view which illustrates one example of a screen of a display device which is illustrated in FIG. 2.

FIG. 4 is a view which illustrates one example of a screen of a display device when selecting "COMPARE DATA" from an operation menu on the display device which is illustrated in FIG. 2.

FIG. 9 is a flow chart which illustrates a processing routine in a robot control device when selecting "COMPARE DATA" from an operation menu.

DETAILED DESCRIPTION

Figure 1:
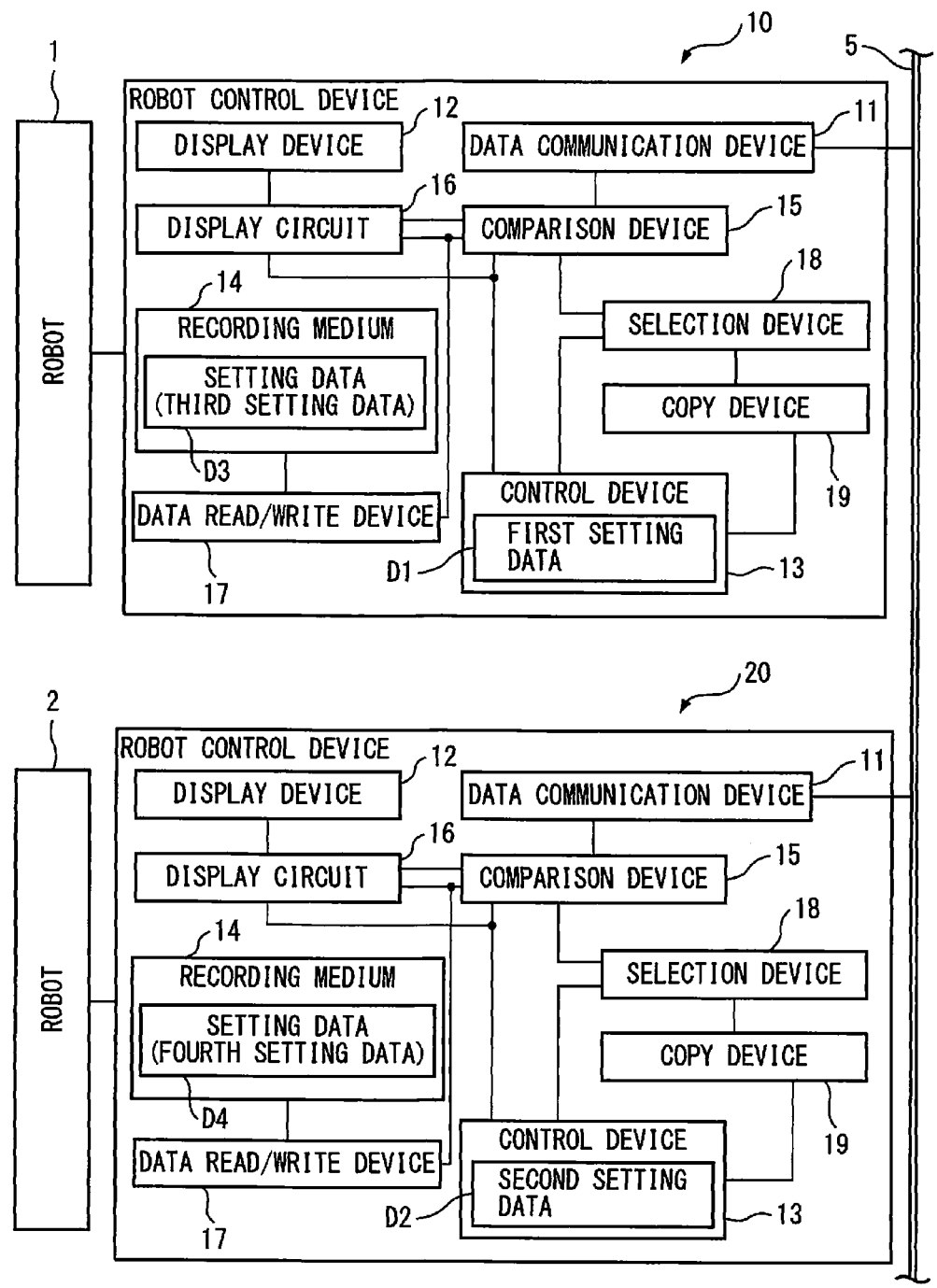
FIG. 1 is a block diagram which illustrates the configuration of one embodiment of a robot control device of the present invention.

Below, referring to the drawings, embodiments of the present invention will be explained in detail based on specific examples. However, it should be understood that the present invention is not limited to the drawings or the embodiments which are explained below.

FIG. 1 illustrates two robot control devices of a robot control device 10 which controls a robot 1 and a robot control device 20 which controls a robot 2. The two robot control devices 10, 20 are connected to be able to exchange data by a data communication network 5. Each of the robot control devices 10, 20 is provided with the configuration of one embodiment of the present invention. Each configuration is illustrated by a block diagram. Further, the configurations of the robot control devices 10, 20 are the same, so the same component members are assigned the same reference notations and only the configuration of the robot control device 10 will be explained.

At the inside of the robot control device 10, a data communication device 11, display device 12, control device 13, storage medium 14, comparison device 15, display circuit 16, data read/write device 17, selection device 18, and copy device 19 are provided. The data communication device 11 communicates with a data communication device 11 of another robot control device which is connected by a data communication network 5, for example, the illustrated robot control device 20, so as to exchange data. The data communication network 5 is, for example, comprised of the Ethernet®, LAN, etc.

The display device 12 in the present embodiment is provided at a main body of the robot control device 10 and can display various types of data by the display circuit 16. Further, the display device 12 can display setting data when setting the robot control device 10. The control device 13 includes a region which records setting data of the robot control device 10. The recorded data which is recorded at this region will be referred to as the "first setting data D1". The display circuit 16 can display the first setting data D1 which was recorded at the control device 13 on the display device 12.

Note that, the control device 13 of the robot control device 20 is configured the same as the robot control device 10, but the setting data which is recorded is the setting data of the robot control device 20 and differs from the setting data of the robot control device 10. Therefore, the setting data which is recorded at the control device 13 of the robot control device 20 is designated as the "second setting data D2".

Further, the robot control device 10 includes a storage medium 14. The storage medium 14 can record various types of data, for example, past setting data of the robot control device 10 (this is designated as the "third setting data D3"). The setting data which is recorded at the storage medium 14 can be read out by the data read/write device 17. Further, the data read/write device 17 can write setting data into the storage medium 14. The third setting data D3 which is read out by the data read/write device 17 from the storage medium 14 can be displayed by the display circuit 16 at the display device 12.

Similarly, the storage medium 14 is configured the same in the robot control device 10 and the robot control device 20, but the various types of data which is recorded, for example, the past setting data of the robot control device, is the setting data of the robot control device 20 and differs from the setting data of the robot control device 10. Therefore, the past setting data which is recorded in the storage medium 14 of the robot control device 20 is designated as the "fourth setting data D4".

The comparison device 15 can compare the first setting data D1 which is set at the control device 13 with the second setting data D2 which is set at the control device 13 of another robot control device, for example the robot control device 20. In this case, for example, the control device 13 of the robot control device 10 sends a command to the control device 13 of the robot control device 20 through the data communication device 11 and the data communication network 5. This being so, the control device 13 of the robot control device 20 sends the second setting data D2 through the data communication device 11 and data communication network 5 to the comparison device 15 of the robot control device 10. As a result, the comparison device 15 of the robot control device 10 can compare the first setting data D1 and the second setting data D2.

Further, the comparison device 15 compares the first setting data D1 which is set at the control device 13 with the third setting data D3 or fourth setting data D4 which is recorded in the storage medium 14 of the robot control device 10 or the storage medium 14 of the robot control device 20. In this case, the third setting data D3 or the fourth setting data D4 may be obtained from the data read/write device 17 of the robot control device 10 or the data read/write device 17 of the robot control device 20.

When the comparison device 15 compares the first setting data D1 with other setting data, it can display the items with differences between the first setting data D1 and the other setting data and the setting data of the items with differences through the display circuit 16 at the display device 12. The display by the comparison device 15, display circuit 16, and display device 12 of the setting data of items with differences will be explained later in detail with examples.

Next, the selection device 18 and the copy device 19 will be explained. The selection device 18 is provided with the function of enabling selection of desired items for copying setting data from items with differences between the first setting data D1 and other setting data. Further, the copy device 19 is provided with the function of enabling designation of the source and destination of setting data of the items which are selected by the selection device 18. For example, when copying between the robot control devices 10, 20, it is possible to designate any of the first to fourth setting data of the robot control devices 10, 20 for the source and destination. The "copy" in this case includes using setting data of items which were selected among items with differences of the setting data of the source to overwrite setting data of the destination.

For example, when the first setting data D1 is the source and when the destination is the robot control device 20, the copy device 19 instructs the control device 13 of the robot control device 20 that the source is the first setting data D1 of the robot control device 10 and the destination is the second setting data D2 of the robot control device 20. Further, due to the copy device 19, the setting data of the items which have been selected in the second setting data D2 is overwritten by the setting data of the items which have been selected in the first setting data D1, so the setting data of those items become the same values.

Conversely, when the second setting data D2 is the source and the destination is the robot control device 10, the copy device 19 instructs the control device 13 of the robot control device 20 that the source is the second setting data D2 of the robot control device 20 and the destination is the first setting data D1 of the robot control device 10. Further, due to the copy device 19, the setting data of the items which have been selected in the first setting data D1 is overwritten by the setting data of the items which have been selected in the second setting data D2, so the setting data of those items become the same values.

In the above-mentioned embodiment, setting data is copied between the two robot control devices 10 which are connected to the data communication network 5, but the number of the robot control devices which are connected to the data communication network 5 and copy setting data is not limited. Further, the display devices may also be provided at the outsides of the robot control devices. The number of the display devices also need not necessarily be one display device connected to each robot control device.

Figure 2:
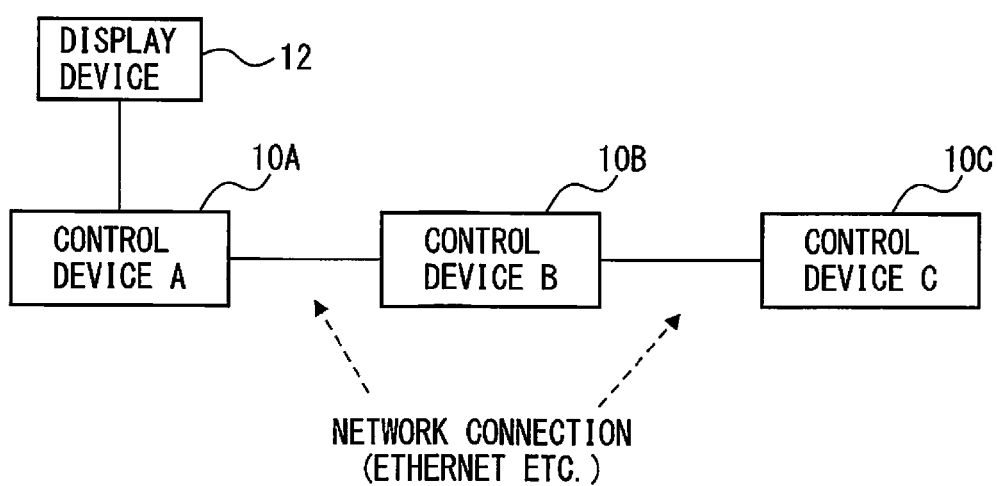
FIG. 2 is a block diagram which illustrates the configuration of another embodiment of a robot control device of the present invention.

FIG. 2 is a block diagram which illustrates the system configuration of an embodiment which includes three robot control devices 10A, 10B, and 10C which are connected by an Ethernet® or other network and in which a display device 12 is provided at only the robot control device 10A. Note that, in FIG. 2, the robot control devices 10A, 10B, and 10C are simply described as the "control device A", "control device B", and "control device C". The robot control devices 10A, 10B, and 10C are individually configured similar to the above-mentioned robot control device 10. While illustration is omitted, they are designated provided with data communication devices, control devices, comparison devices, selection devices, and copy devices. In this embodiment, only the robot control device 10A is provided with a display circuit for making the display device 12 display data.

In the system which is illustrated in FIG. 2, the setting data which is set at a specific robot control device is designated as the "main data", the setting data which is set at another robot control device is designated as the "secondary data", and the comparison devices are used to compare the main data and secondary data for each item. Note that, here, the terms "main data" and "secondary data" are used to differentiate data, but there is no difference between the main data and secondary data. Further, the items of the secondary data with differences from the main data and the setting data of the items with differences may be displayed by the display circuit at a single display device 12.

In this case, the selection device can be used to select items for copying of setting data from the items with differences between the main data and the secondary data. Further, the source and destination of the setting data of the items which have been selected by the selection device can be designated by the selection device from the main data and the secondary data. Furthermore, the copy device can be used to copy setting data of items which have been selected by the selection device from the source to the destination. As explained above, there is no difference between the main data and secondary data, so either the main data or the secondary data can be made the source or destination.

Furthermore, when a robot control device is provided with a storage medium and a data read/write device, any of setting data of another robot control device which is stored in the storage medium, setting data of the robot control device where at least part of the items of the setting data are changed, or past setting data of the robot control device also can be read and written for setting data. This being so, the setting data which is set at a specific robot control device is designated as the "main data", the setting data which is stored at the storage medium is designated as the "secondary data", and the comparison devices are used to compare the main data and secondary data for each item. Here too, the terms "main data" and "secondary data" are used to differentiate data, but there is no difference between the main data and secondary data.

In this case as well, the items of the secondary data with differences from the main data and the setting data of the items with differences may be displayed by the display circuit at a display device to enable comparison. Further, the selection device can be used to select items for copying of setting data from the items with differences between the main data and the secondary data. Further, the source and destination of the setting data of the items which have been selected by the selection device can be designated by the selection device from the main data and the secondary data. Furthermore, the copy device can be used to copy setting data of items which have been selected by the selection device from the source to the destination.

Note that, in the embodiments which were explained above, the display device 12 can be provided with a touch panel. If the display device 12 is provided with a touch panel, the selection by the selection device of the items for copying setting data and the designation by the copy device of the source and destination of the setting data can be performed by input to the touch panel.

Here, the case of using the screen of the display device 12 in the system which uses the robot control devices 10A, 10B, and 10C which is illustrated in FIG. 2 so as to compare main data and secondary data and copy data between the main data and the secondary data will be explained.

Figures 3, 4:
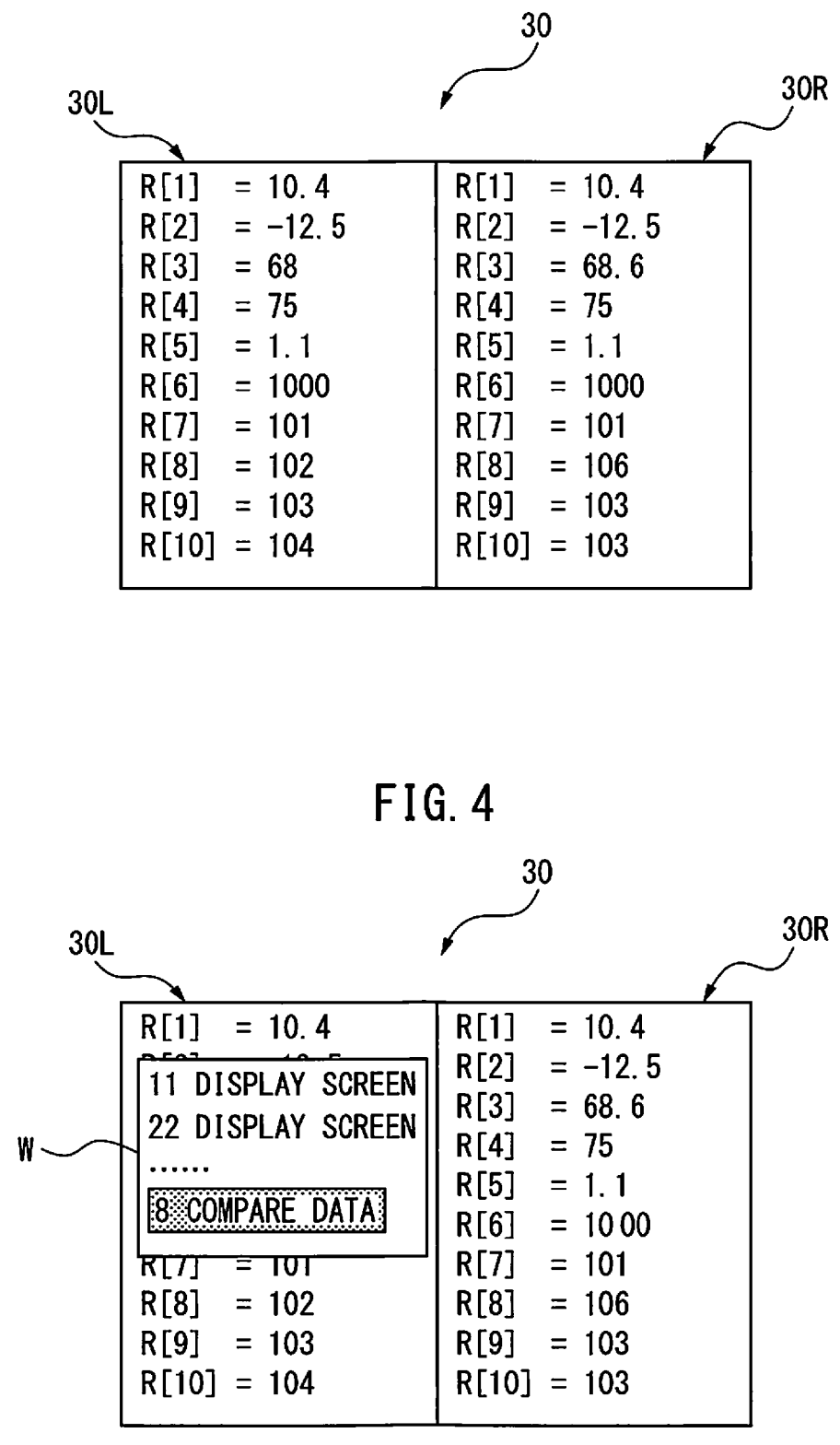

FIG. 3 illustrates an example of display of a screen 30 of the display device 12 which is connected to the robot control device 10A which is illustrated in FIG. 2. FIG. 3 illustrates an embodiment where the screen 30 of the display device 12 is made a mode which is split into the left and right into a left screen 30L and a right screen 30R for display. In the present embodiment, the left screen 30L displays the screen which illustrates setting data of the robot control device 10A (control device A). The items of the setting data for comparison are displayed from R[1] to R[10]. The items R[1] to R[10] display the setting data by numerical values. The right screen 30R displays the screen which illustrates setting data of the robot control device 10B (control device B). The items of the setting data for comparison are displayed from R[1] to R[10]. The items R[1] to R[10] display the setting data by numerical values. The robot control device 10A acquires, from the robot control device 10B to be compared with, the data corresponding to the right screen 30R by the already explained method.

FIG. 4 illustrates one example of the screen 30 of the display device 12 when selecting "COMPARE DATA" from the operation menu on the display device 12 which is illustrated in FIG. 2. The operation menu is not illustrated, but may also be provided as operating buttons on the display device 12. Further, the device may be configured so that if pressing the setting menu button, the screen 30 is displayed as a subscreen (window) W such as illustrated in FIG. 4.

Figure 5:
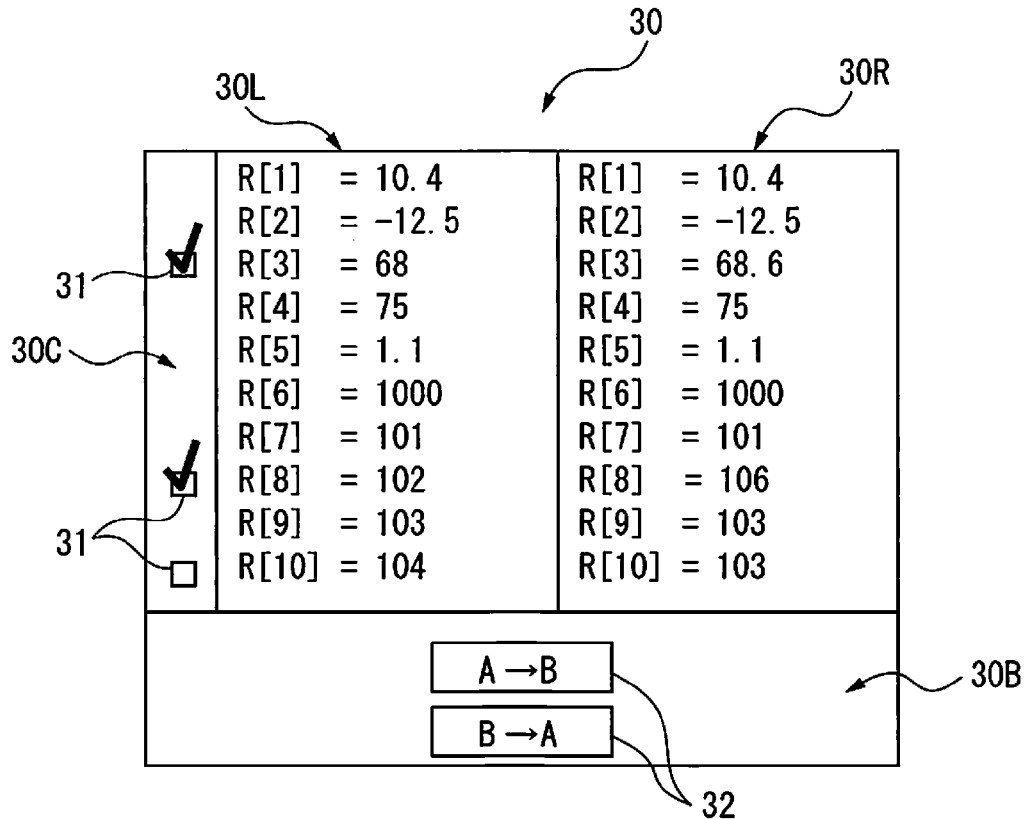
FIG. 5 is a view which illustrates an example of display of different data on a screen of the display device which is illustrated in FIG. 3 when selecting "COMPARE DATA" from an operation menu on the display device which is illustrated in FIG. 2.

FIG. 5 illustrates an example where the screen 30 of the display device 12 which is illustrated in FIG. 3 displays differing data, checkboxes 31, and copy direction buttons 32 when "COMPARE DATA" in the window W is selected from the operation menu on the screen 30 which is illustrated in FIG. 4. If "COMPARE DATA" which is illustrated in FIG. 4 is selected, the robot control device 10A compares the data corresponding to the left screen 30L and the acquired setting data of the robot control device 10B which is s illustrated on the right screen 30R.

Further, as a result of the comparison, the screen 30 is further split, a checkbox screen 30C is displayed adjacent to the left of the left screen 30L, a copy instruction screen 30B is formed at the bottom side of the screen 30, and the copy instruction screen 30B displays copy direction buttons 32. In the present embodiment, the checkbox screen 30C adjacent to the items R[3], R[8], and R[10] with differences in the setting data displays checkboxes 31. Further, the copy direction buttons 32 include an "A→B" button which illustrates the operation for copying the setting data from the robot control device 10A to the robot control device 10B and a "B→A" button which illustrates the operation for copying setting data from the robot control device 10B to the robot control device 10A.

Here, the operation in the case of changing the setting data of the robot control device 10B to the setting data of the robot control device 10A for the setting data of the item R[3] and item R[8] and not changing the setting data of the robot control device 10B for the setting data of the item R[10] will be explained. In this case, the checkboxes 31 at the left sides of the item R[3] and item R[8] are selected and the checkbox 31 of the item R[10] is not selected. Due to this operation, the checkboxes 31 at the left sides of the item R[3] and item R[8] are checked.

The case where, in this state, the "A→B" button which illustrates the operation of copying the setting data from the robot control device 10A to the robot control device 10B will be explained. In this case, the setting data of the item R[3] and item R[8] of the left screen 30L is copied to the item R[3] and item R[8] of the right screen 30R, while the setting data of the item R[3] and item R[8] of the right screen 30R is replaced by the setting data of the item R[3] and item R[8] of the left screen 30L. That is, for the setting data of the item R[3] and item R[8], the setting data of the robot control device 10B is changed to the setting data of the robot control device 10A.

Figure 6:
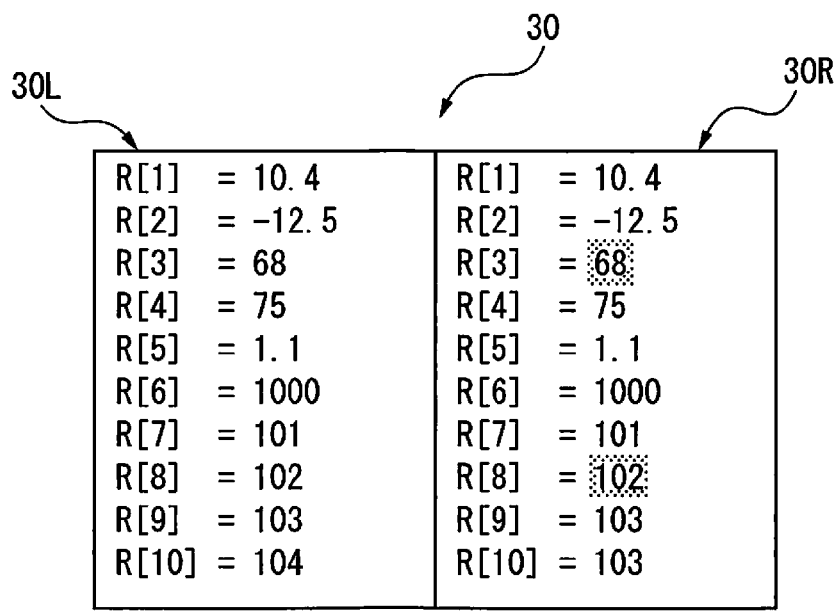
FIG. 6 is a view which illustrates one example of a screen of a display device which illustrates the state where different data is switched and becomes the same on the screen of the display device which is illustrated in FIG. 5.

The screen which is illustrated in FIG. 6 illustrates the state after the setting data of the item R[3] and item R[8] is changed from the setting data of the robot control device 10B to the setting data of the robot control device 10A. The checkbox 31 at the left side of the item R[10] for the setting data of the item R[10] was not checked, so that setting data is not changed.

In the above explained embodiments, the setting data of the robot control device 10A and the setting data of the robot control device 10B are compared using the same screen 30, but the number of robot control devices which can be compared by the screen 30 is not limited. For example, the setting data of three robot control devices of the robot control devices 10A, 10B, and 100 which are illustrated in FIG. 2 can also be displayed by splitting the screen 30 into three. Further, in the above explained embodiments, all of the items of the setting data of the robot control devices were displayed, but it is also possible to display only items with differences between the robot control devices. For example, it is also possible to have the screen 30 which is illustrated in FIG. 3 display only the items R[3], R[8], and R[10] with differences in the setting data together with the data.

Further, in the above explained embodiments, the case where a plurality of robot control devices were connected to be able to communicate was explained, but an embodiment where robot control devices are not designed to be able to communicate at the time of comparing the setting data is possible. That embodiment will be explained below. A robot control device which is not designed so that the robot control device can communicate with another robot control device is provided with a data read/write device of a storage medium and with a display device. The data read/write device can read the storage medium in which other setting data of a robot control device is stored. Further, the data read/write device can read and write setting data at the storage medium in which setting data where at least part of the items of the setting data of the robot control device has been changed is stored.

Inside of the robot control device, there is a comparison device which designates the setting data which is set at the robot control device as the main data, designates the setting data which is stored in the storage medium as the secondary data, and compares the main data and the secondary data for each item. Further, a display circuit is also provided which displays items of the secondary data with differences from the main data and setting data of the items with differences at the display device in a format enabling comparison.

Figure 7:
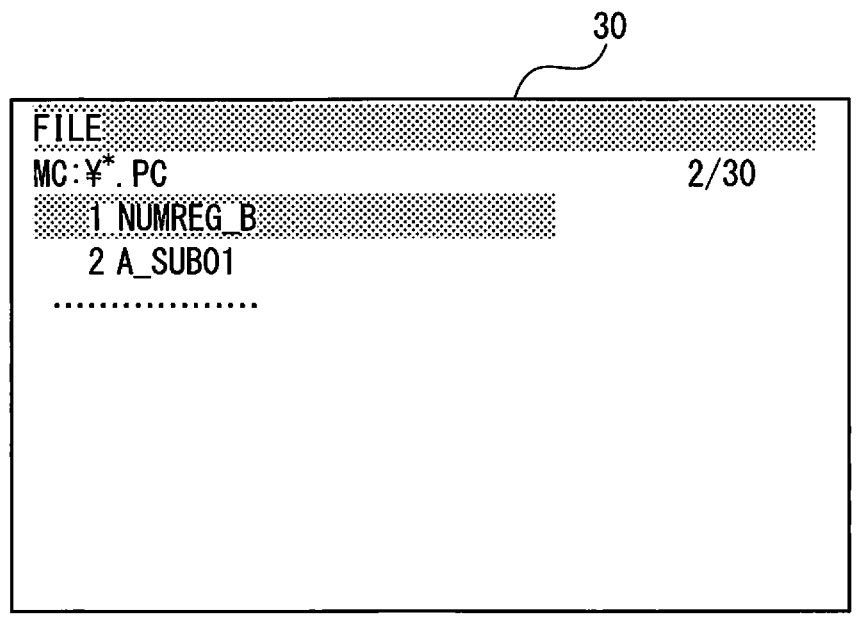
FIG. 7 is a view which illustrates a screen for call-up of a backup file when part of the data of one control device includes a file which backs up data of another control device.

FIG. 7 illustrates the screen 30 for call-up of a backup file which can be read out by a data read/write device when part of the data of the storage medium at one control device includes a file which backs up data of another control device. The data "NUMREG_B" which is illustrated at this screen 30 illustrates that a file which backs up data of another robot control device is stored in the storage medium.

Figure 8:
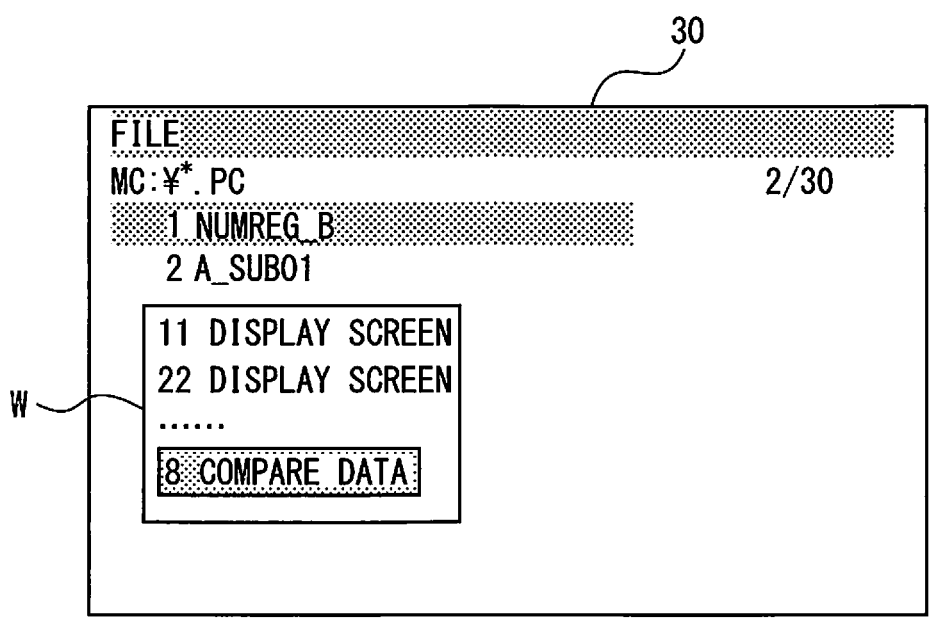
FIG. 8 is a view which illustrates one example of a screen of a display device when selecting "COMPARE DATA" from an operation menu on the display device which is illustrated in FIG. 7.

Therefore, as illustrated in FIG. 8, on the screen 30 which is illustrated in FIG. 7, by using the operation menu to select "COMPARE DATA" from the window W which is displayed on the screen 30, it is possible to compare with main data which is set at the robot control device with the secondary data which is stored at the storage medium. In the data which is displayed when selecting "COMPARE DATA" from the window W, like the screen 30 which is illustrated in FIG. 3, the left screen 30L displays the main data which is set at the robot control device while the right screen 30R displays the secondary data which is stored at the storage medium.

In general, if loading a backup file such as illustrated by "NUMREG_B", all of the data which is stored in the backup file "NUMREG_B" is reflected. In this regard, according to the art of the present invention, before reflecting the data, it is possible to display only the setting data which is necessary for setting the robot control device in the data which is stored in the backup file "NUMREG_B", for example, only the item R[1] to the item R[10], on the screen 30 in a manner comparing the main data and the secondary data.

As a result, even if the backup file "NUMREG_B" is a binary file, it is possible to visually confirm the content, select only the necessary parts, and display them at the screen 30 of the robot control device and possible to make the setting data of the robot control device which performs the settings reflect the setting data which is stored in the storage medium.

FIG. 9 is a flow chart which illustrates one example of the processing routine in the robot control device (hereinafter simply referred to as the "control device") when selecting "COMPARE DATA" from the operation menu. At step 901, the control device for performing the setting and the setting data to be compared with are designated. This designation operation may be diverse as it depends on whether the setting data to be compared with is at another control device, is at a storage medium, or is at both. Here, the case where the setting data to be compared with is at another control device will be explained.

If the location of the setting data to be compared with is designated, at step 902, the designated setting data is acquired from the designated other control device by the control device which performs the settings. At the following step 903, the acquired data is compared with and the points of difference are extracted. Further, the routine proceeds to step 904 where it is judged if the compared data has points of difference. If there are no points of difference (NO), the routine proceeds to step 908 where the display device of the control device which performs the settings displays that the setting data at the other control device which was compared with is the same as the control device which performs the settings and the routine is ended.

On the other hand, when the judgment of step 904 is that there are points of difference in the compared setting data (YES), the routine proceeds to step 905. At step 905, the display device of the control device which performs the settings displays a screen such as illustrated in FIG. 5 which illustrates the points of difference and select buttons for the copy direction.

At the next step 906, the comparison screen which is obtained at step 905 is viewed and it is determined whether to select to reflect the points of difference. When the operator of the control device performing the settings does not select to reflect the points of difference (NO), nothing is done and this routine is ended. On the other hand, when the operator of the control device which performs the settings selects to reflect the points of difference (YES), the routine proceeds to step 907 where the selected setting data is copied in a designated direction between designated control devices and this routine is ended. In this case, the setting data of the other control device is copied as setting data of the control device of the side performing the settings.

Even when referring to and reflecting setting data between a control device and a storage medium which has been inserted into the control device, the setting data can be copied by the same routine as the routine which is illustrated in FIG. 9.

Above, the present invention was explained with reference to preferred embodiments, but a person skilled in the art would understand that various modifications and changes can be made without departing from the scope of the later explained claims.

What is claimed is:

1. A robot control device, comprising:
   a display device;
   a control device configured to control a robot and having first setting data set in a file at said control device;
   at least one of
      a data communication device configured to communicate with another robot control device, said another robot control device configured to control another robot and having second setting data set in a file at said another robot control device, and
      a data read/write device configured to read and write third setting data in a storage medium of said robot control device,
      wherein each of said first through third setting data comprises a plurality of items;
   a comparison device configured to compare
      each item of said plurality of items of the first setting data with
      a corresponding item of said plurality of items of at least one of the second and third setting data; and
   a display circuit configured to display, on said display device, said plurality of items in which a comparison by said comparison device reveals both similarities and differences between
      said first setting data and
      said at least one of said second and third setting data,
      at least one selectable check mark having a checkmark marking area adjacent to the item of said first setting data and said at least one of said second and third setting data whose data differ from the first setting data, and
      two copy direction marks configured to designate a source of item and a destination of item, each of the two copy direction marks indicating one of two copy directions of the setting data, including
         a copy direction from said first setting data to said at least one of said second and third setting data, and
         a copy direction from said at least one of said second and third setting data to said first setting data,
   a selection device configured to select, from among the items revealing the differences between said first setting data and said at least one of said second and third setting data, at least one item whose checkmark marking area is filled with a checkmark for copying setting data, and
   a copy device configured to copy and overwrite said first setting data with said at least one of said second and third setting data, or to copy and overwrite said at least one of said second and third setting data with said first setting data based on the copy direction indicated by a selected one of said copy direction marks,
      wherein only the setting data of the at least one item whose checkmark marking area is filled with a checkmark will be overwritten based on said selected copy direction mark.

2. The robot control device according to claim 1, wherein said copy device is configured to
   instruct said another robot control device, which is the destination, that the source is the robot control device to which said copy device belongs, when the robot control device to which said copy device belongs is the source, and
   instruct said another robot control device, which is the source, that the destination is the robot control device to which said copy device belongs, when the robot control device to which said copy device belongs is the destination.

3. The robot control device according to claim 1, wherein said display device is provided with a touch panel configured to receive
selection of said check mark adjacent to the items for copying setting data by said selection device, and
selection of one of said copy direction mark which designates the source and destination of the selected items for copying setting data.

4. The robot control device according to claim 1, wherein said display device is provided independently at the outside of a main body of said robot control device.

5. The robot control device according to claim 1, wherein said check mark having the checkmark marking area is a check box.

6. A system, comprising:
a data communication device;
a plurality of robot control devices which are connected by the data communication device, and which are configured to control a plurality of robots;
at least one display device;
a comparison device configured to
designate setting data which is set in a file at a specific robot control device of the plurality of robot control devices as main data, and setting data which is set in files at other robot control devices of the plurality of robot control devices as secondary data, wherein each of said main and secondary data comprises a plurality of items, and
compare each item of the plurality of items of said main data with a corresponding item of the plurality of items of said secondary data; and
a display circuit configured to display on said display device
among the plurality of items of said secondary data, items with differences from the corresponding items of said main data, and
setting data values of said items with the differences
at least one selectable check mark having a checkmark marking area adjacent to the item of said main data and said secondary data whose data differ from the main data, and
two copy direction marks configured to designate a source of item and a destination of item, each of the two copy direction marks indicating one of two copy directions of the setting data, including
a copy direction from said main data to said secondary data, and
a copy direction from said secondary data to said main data,
a selection device configured to select, from among said items with the differences between said main data and said secondary data, at least one item whose checkmark marking area is filled with a checkmark for copying setting data, and
a copy device configured to copy and overwrite said main data value with said secondary data value, or to copy and overwrite said secondary data value with said main data value based on the copy direction indicated by a selected one of said copy direction marks,
wherein only the setting data value of the at least one item whose checkmark marking area is filled with a checkmark will be overwritten based on said selected copy direction mark.

7. The system according to claim 6, wherein said display device is provided with a touch panel configured to receive
selection of said check mark adjacent to the items for copying setting data by said selection device, and
selection of one of said copy direction mark which designates the source and destination of the selected items for copying setting data.

8. The system according to claim 6, wherein said display device is provided independently at the outside of a main body of at least one of said plurality of robot control devices.

9. A robot control device, comprising:
a display device;
a control device configured to control a robot;
at least one of
a first storage medium in which first setting data of another robot control device is stored in a file, said another robot control device configured to control another robot, and
a second storage medium in which second setting data of said robot control device is stored in a file, wherein each of said first and second setting data comprises a plurality of items, and at least some of the plurality of items of the second setting data of said robot control device stored in the second storage medium have been changed;
a comparison device configured to
designate the second setting data which is set at said robot control device as main data and the first setting data which is stored at said first storage medium as secondary data, and
compare each item of said plurality of items of said main data with a corresponding item of said plurality of items of said secondary data; and
a display circuit configured to display on said display device
among the plurality of items of said secondary data, items with differences from the corresponding items of said main data, and
setting data values of said items with the differences
at least one selectable check mark having a checkmark marking area adjacent to the item of said first setting data and said second setting data whose data differ from the first setting data, and
two copy direction marks configured to designate a source of item and a destination of item, each of the two copy direction marks indicating one of two copy directions of the setting data, including
a copy direction from said first setting data to said second setting data, and
a copy direction from said second setting data to said first setting data,
a selection device configured to select, from among said items with the differences between said main data and said secondary data, at least one item whose checkmark marking area is filled with a checkmark for copying setting data, and
a copy device configured to copy and overwrite said first setting data value with said second setting data value, or to copy and overwrite said second setting data value with said first setting data value based on the copy direction indicated by a selected one of said copy direction marks,
wherein only the setting data value of the at least one item whose checkmark marking area is filled with a checkmark will be overwritten based on said selected copy direction mark.

10. The robot control device according to claim 9, wherein said display device is provided with a touch panel configured to receive
- selection of said check mark adjacent to the items for copying setting data by said selection device, and
- selection of one of said copy direction mark which designates the source and destination of the selected items for copying setting data.

11. The robot control device according to claim 9, wherein said display device is provided independently at the outside of a main body of said robot control device.

12. The robot control device according to claim 9, wherein the setting data values of said items with the differences displayed on said display device are numeric values.

* * * * *